US008471841B2

(12) United States Patent
Evanicky et al.

(10) Patent No.: US 8,471,841 B2
(45) Date of Patent: Jun. 25, 2013

(54) COMPACT FLAT PANEL COLOR CALIBRATION SYSTEM

(75) Inventors: Daniel Evanicky, San Jose, CA (US); Ed Granger, Rochester, NY (US); Joel Ingulsrud, Carmichael, CA (US); Alice T. Meng, Redwood City, CA (US)

(73) Assignee: RPX Corporation, San Francisco, CA (US)

( * ) Notice: Subject to any disclaimer, the term of this patent is extended or adjusted under 35 U.S.C. 154(b) by 0 days.

(21) Appl. No.: 13/469,909

(22) Filed: May 11, 2012
(Under 37 CFR 1.47)

(65) Prior Publication Data

US 2012/0218320 A1 Aug. 30, 2012

Related U.S. Application Data

(63) Continuation of application No. 12/181,773, filed on Jul. 29, 2008, now Pat. No. 8,179,405, which is a continuation of application No. 11/426,469, filed on Jun. 26, 2006, now Pat. No. 7,405,742, which is a continuation of application No. 11/053,068, filed on Feb. 7, 2005, now Pat. No. 7,068,263, which is a continuation of application No. 10/013,576, filed on Dec. 10, 2001, now Pat. No. 6,853,387.

(60) Provisional application No. 60/254,432, filed on Dec. 8, 2000.

(51) Int. Cl.
*G09G 5/00* (2006.01)

(52) U.S. Cl.
USPC .......................................... 345/212; 345/690

(58) Field of Classification Search
USPC ...................... 345/76–98, 204–215, 690–699
See application file for complete search history.

(56) References Cited

U.S. PATENT DOCUMENTS

| 5,245,326 A | 9/1993 | Zalph |
| 5,325,195 A | 6/1994 | Ellis et al. |
| 5,593,221 A | 1/1997 | Evanicky et al. |
| 5,696,529 A | 12/1997 | Evanicky et al. |
| 5,831,697 A | 11/1998 | Evanicky et al. |
| 5,896,119 A | 4/1999 | Evanicky et al. |
| 5,986,737 A | 11/1999 | Evanicky et al. |
| 6,061,104 A | 5/2000 | Evanicky et al. |

(Continued)

FOREIGN PATENT DOCUMENTS

| EP | 0 539 943 A1 | 5/1993 |
| EP | 0 926 890 A2 | 6/1999 |

(Continued)

OTHER PUBLICATIONS

PCT International Search Report in International Application No. PCT/US/01/4811 dated Sep. 3, 2002, 7 pages.

(Continued)

*Primary Examiner* — Vijay Shankar
(74) *Attorney, Agent, or Firm* — Howison & Arnott, L.L.P.

(57) ABSTRACT

A compact flat panel color calibration system includes a lens prism optic able to pass a narrow, perpendicular, and uniform cone angle of incoming light to a spectrally non-selective photodetector. The calibration system also includes a microprocessor operable to determine the luminance of the display based upon the information gathered by the photodetector. A software module included in the calibration system is then operable to process the luminance information in order to adjust the flat panel display.

18 Claims, 8 Drawing Sheets

U.S. PATENT DOCUMENTS

| | | | |
|---|---|---|---|
| 6,144,360 | A | 11/2000 | Evanicky et al. |
| 6,243,068 | B1 | 6/2001 | Evanicky et al. |
| 6,320,652 | B1 | 11/2001 | Morimoto et al. |
| 6,459,425 | B1 | 10/2002 | Holub et al. |
| 6,853,387 | B2 | 2/2005 | Evanicky et al. |
| 6,911,969 | B1 | 6/2005 | Nelson et al. |
| 7,068,263 | B2 | 6/2006 | Evanicky et al. |
| 7,136,076 | B2 | 11/2006 | Evanicky et al. |
| 7,405,742 | B2 * | 7/2008 | Evanicky et al. ............. 345/690 |
| 7,647,237 | B2 | 1/2010 | Malave et al. |
| 8,179,405 | B2 * | 5/2012 | Evanicky et al. ............. 345/690 |
| 2002/0193679 | A1 | 12/2002 | Malave et al. |

FOREIGN PATENT DOCUMENTS

| | | |
|---|---|---|
| JP | 2-7693 | 1/1990 |
| JP | 8-331576 | 12/1996 |
| JP | 2000-221110 | 8/2000 |
| JP | 2000-337998 | 12/2000 |
| WO | WO 00/05706 | 2/2000 |

OTHER PUBLICATIONS

Hwang, et al., "29.4L: Late-News Paper: Image Synchronized Brightness Control," SID 01 Digest, pp. 492-493, 2001.

"Silicon Graphics® 1600SW Flat Panel Display," two unnumbered pages, 1999.

Evanicky, et al., "17.2: Wide Aspect FPM with Calibrated High Information Content Display," SID 01 Digest, pp. 1-4.

Japanese Search Report, 3 pages.

\* cited by examiner

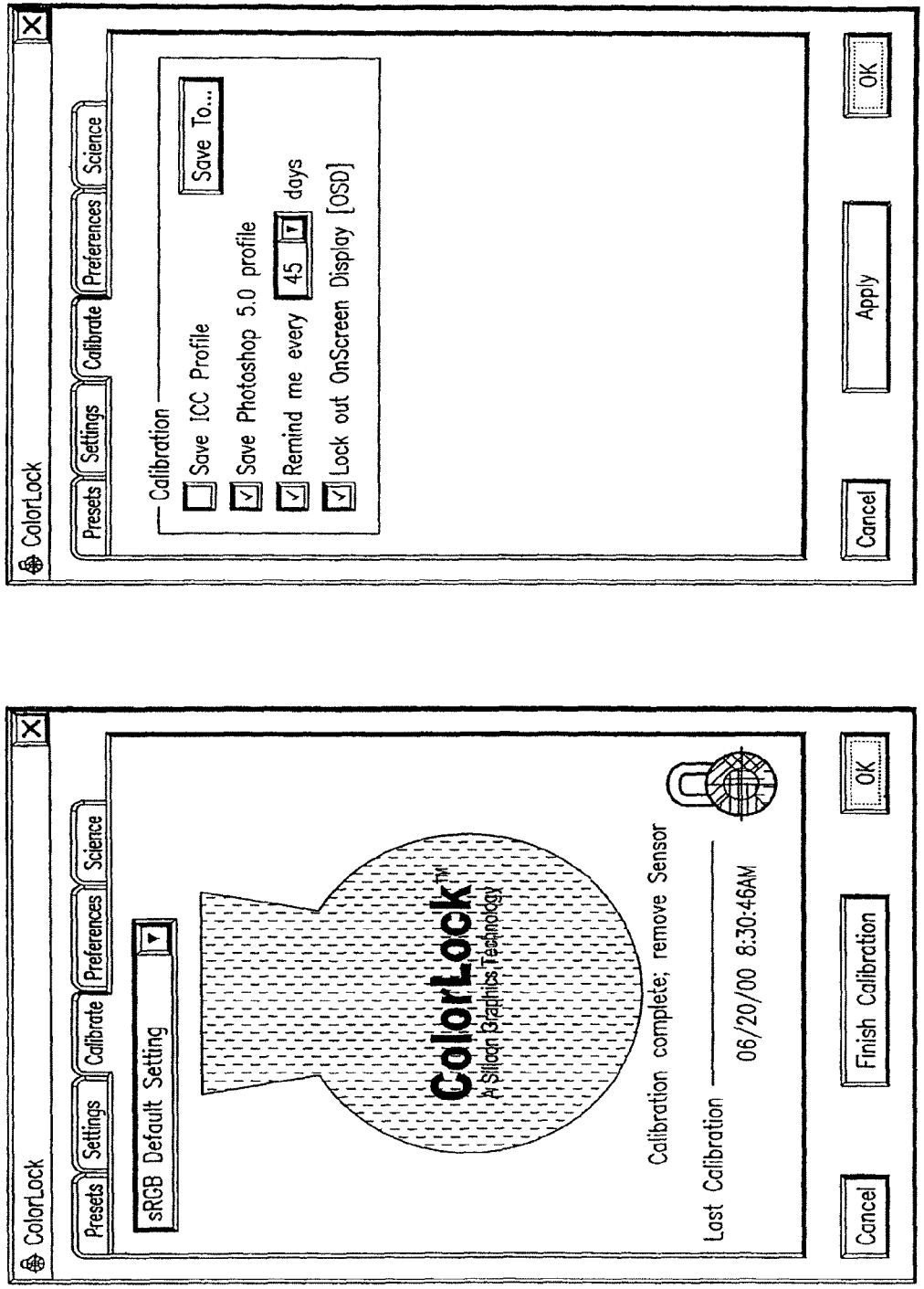

COMPACT FLAT PANEL COLOR CALIBRATION SYSTEM

CROSS-REFERENCE TO RELATED APPLICATIONS

This application is a continuation of U.S. application Ser. No. 12/181,773 filed Jul. 29, 2008 and now U.S. Pat. No. 8,179,405 issued May 15, 2012, which is a continuation of U.S. application Ser. No. 11/426,469 filed Jun. 26, 2006 and now U.S. Pat. No. 7,405,742 issued Jul. 29, 2008, which is a continuation of U.S. application Ser. No. 11/053,068 filed Feb. 7, 2005 and now U.S. Pat. No. 7,068,263 issued Jun. 27, 2006, which is a continuation of U.S. application Ser. No. 10/013,576 filed Dec. 10, 2001 and now U.S. Pat. No. 6,853,387 issued Feb. 7, 2006, which claims the benefit of U.S. Provisional Application No. 60/254,432 filed Dec. 8, 2000. The disclosures of each of the above are hereby incorporated herein by reference.

TECHNICAL FIELD OF THE INVENTION

The present invention relates in general to the field of photodetector devices and more particularly to a flat panel color calibration system.

BACKGROUND OF THE INVENTION

Conventional radiometric or colorimetric sensor systems employ either spectrally selective or nonselective photodetectors to quantify the luminance level of the light that reaches them. Such sensor systems have been used to calibrate Cathode Ray Tube (CRT) displays. To ensure accuracy, these sensor systems must maintain the sensor elements in contact with or at a uniform fixed distance from the display. A common implementation of such a sensor system utilizes a suction cup in order to firmly adhere the sensor to the CRT screen that has the additional effect of blocking out any ambient light from the sensor. For Liquid Crystal Displays (LCDs), however, the colorimetry of the display is dependent in part on the optical path length of the display which is the product of the birefringence of the liquid crystal material and the cell gap spacing. Since the glass of a LCD panel is relatively thin when compared to that of a CRT, the force of the suction used to attach that type of sensor would cause spacing changes that would change the luminous intensity of the light in that area and corrupt the accuracy of the very measurement that such a sensor would be attempting to make.

Unlike CRTs, both the luminance and the wavelength of light emitted from LCD flat panels vary depending on the angle at which they are measured or collected. This poses a problem for traditional color calibration sensors that all assume any portion of the light measured is representative of the whole. Therefore, it is desirable to provide a sensor system capable of accurately calibrating LCD devices that does not alter the cell gap spacing and collects luminance information orthogonal to the surface of the glass and with a narrow acceptance angle.

SUMMARY OF THE INVENTION

From the foregoing it may be appreciated by those skilled in the art that a need has arisen for a compact flat panel color calibration system. In accordance with one preferred embodiment of the present invention, a system for calibrating the color of a flat panel display is provided that substantially eliminates or greatly reduces disadvantages and problems associated with conventional display calibration techniques.

According to an embodiment of the present invention, there is provided a system for calibrating a display that includes a lens prism optic that operates to pass a narrow, perpendicular, and uniform cone angle of incoming light, a photodetector, a microprocessor operable to determine the luminance of the display in order to derive the color temperature and firmware operable to adjust the display in accordance with the microprocessor determination.

The present invention provides various technical advantages over conventional display calibration techniques. For example one technical advantage enables accurate measurements of a Liquid Crystal Display (LCD) by employing a lens prism optic that provides a narrow and uniform beam of light to the photodetector system. Another technical advantage is to augment the calibration measurement by allowing the system to compensate for the effects of ambient light that might be glaring off the surface of the display. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIGS. 5A-H illustrate screen displays provided by the software modules.

DETAILED DESCRIPTION OF THE INVENTION

Figure 1:
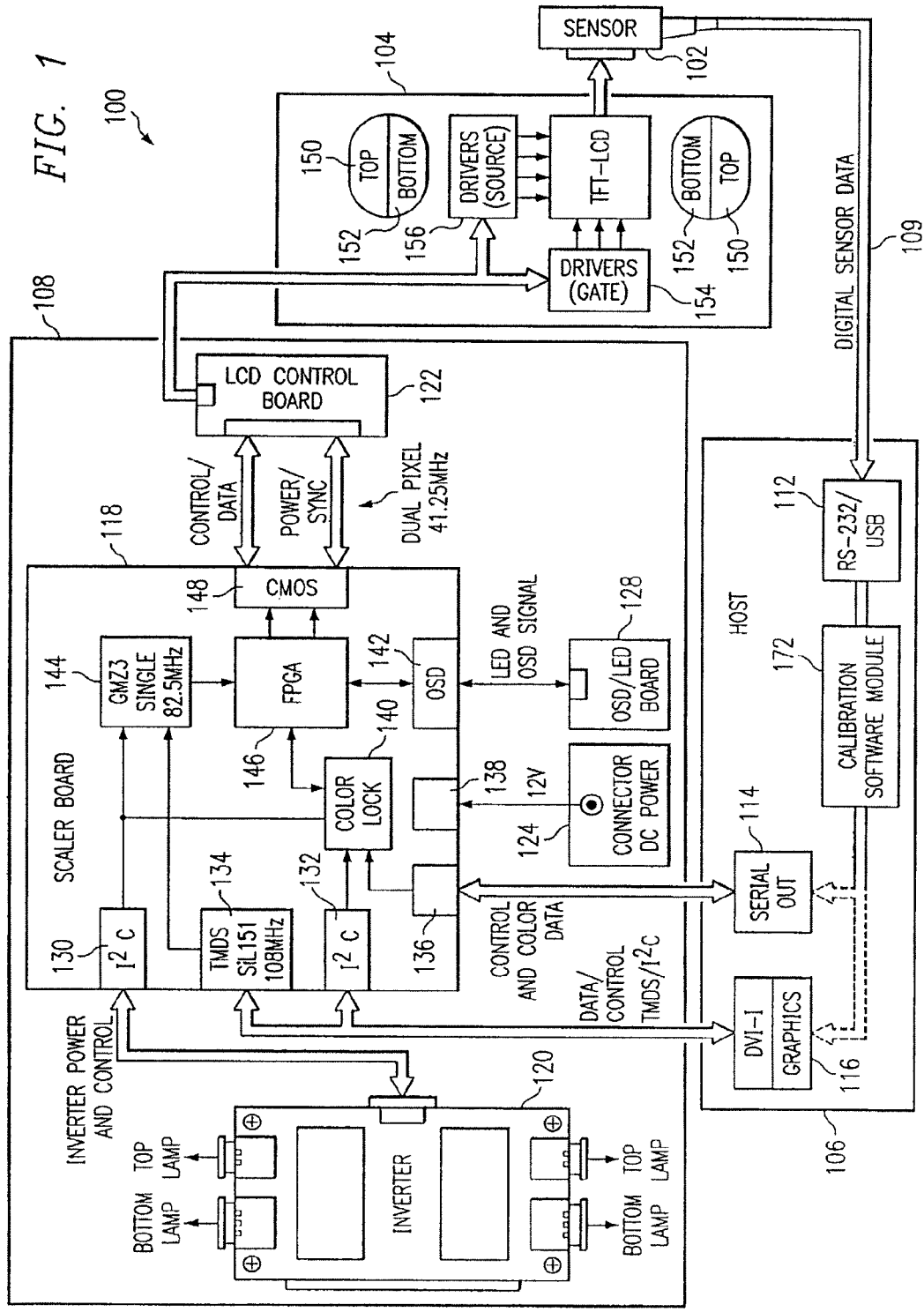
FIG. 1 illustrates a simplified diagram of the environment of a compact flat panel color calibration system.

FIG. 1 shows a flat panel color calibration system 100. Flat panel color calibration system 100 includes a sensor system 102, a backlit Liquid Crystal Module 104, a host computer 106, and a flat panel monitor 108 associated with liquid crystal module 104. Typically, flat panel monitor 108 and liquid crystal module 104 are part of a single display device. Sensor system 102 measures luminance information emitted by liquid crystal module 104 and provides the luminance information to the calibration software module 172 residing within host computer 106 over an I2C serial interface portion of a video signal cable, RS 232, or Universal Serial Bus (USB) connection 109. Host computer 106 includes a digital interface port 112 for receiving the luminance information from sensor system 102, and either a serial port 114 or a graphics interface port 116 for relaying commands to flat panel monitor 108. The calibration software application within host computer 106 then provides calculated color adjustments based on the luminance information received from sensor system 102 to flat panel monitor 108. Flat panel monitor 108 includes a scaler board 118 for receiving color correction information from the calibration software application within host computer 106. Flat panel monitor 108 also includes an inverter unit 120 for driving a pair of top (red) lamps 150 and a pair of bottom (blue) lamps 152 of liquid crystal module 104. A LCD control board 122 provides the signals to control gate drivers 154 and source drivers 156 of liquid crystal module 104. An on-screen display (OSD) board 128 provides a graphical user interface driven by mechanical push button controls for manual adjustment of flat panel monitor 108. OSD board 128 also includes a visual control board that provides appropriate visual control signals for flat panel monitor 108.

Scaler board 118 of Flat Panel Monitor 108 includes an Inter-Integrated Control (I2C) input interface 132 from host computer 106 to manage several components via independent buses. These include a ColorLock microcontroller 140 which handles executive control of color management functions, a backlight inverter 120 accessed through an I²C interface 130, and an Extended Display Identification (EDID) EEPROM 142 which contains colorimetric profile information for the specific liquid crystal module 104. A Transition Minimized Differential Signal (TMDS) Receiver 134 accepts video information from graphics interface port 116 residing within host computer 106 and forwards it to a gmZ3 scaler chip 144 which adapts the input graphics into a resolution format compatible with liquid crystal module 104. A Field Programmable Gate Array (FPGA) device 146 multiplexes user inputs from the OSD board 128 through EEPROM device 142 onto the main display data path via CMOS device 148 to provide menu-driven settings of various liquid crystal module 104 functions. FPGA device 146 also controls manual dimming of the backlight from an OSD panel 142 by controlling inverter 120 through I2C interface 130. In one embodiment, control data and control commands are received into a level-shifter serial port 136 from a serial output 114 within host computer 106. In this embodiment, serial port 136 is RS-232 but may also be of the Universal Serial Bus (USB) type. 12V system power is provided through an input connector 138 for an external plug 124.

Flat panel monitor 108 supports non-native resolutions through an operation known as scaling. Scaling adapts the input graphics mode into a resolution that meets the stringent timing requirements of the VESA timing specification. Flat panel monitor 108 has the ability to adjust the displayed image automatically for the user. In general, the embedded scaler chip 144 analyzes the input timing provided by host graphics card 116 through TMDS receiver 134 and adjusts the liquid crystal module 104 to optimal image quality. These extensive scaling and image color adjustment capabilities demand an intuitive user interface. On a display product, on-screen controls appear superimposed over the regular image. Executive color control in our embodiment resides within an 8051-based microcontroller 140. Microcontroller 140 has an 8-bit 8051 architecture that provides flexible general purpose I/O, built-in program memory, RAM, and other peripheral devices. The low cost of microcontroller 140 is also appropriate for a single calibration technique Colorlock. FPGA device 146 multiplexes the OSD board 128 data onto the main display datapath. FPGA device 146 also controls backlight dimming for the system. This control is accomplished via SPI bus communication with the microcontroller 140. Via an included EDID EEPROM 142, microcontroller 140 is able to perform an I²C master read of this device and obtain the panel's serial number for display on the information screen provided by OSD board 128. Certain parameters are stored on a global memory page whereas other settings are saved in timing mode-specific memory pages.

Figure 2:
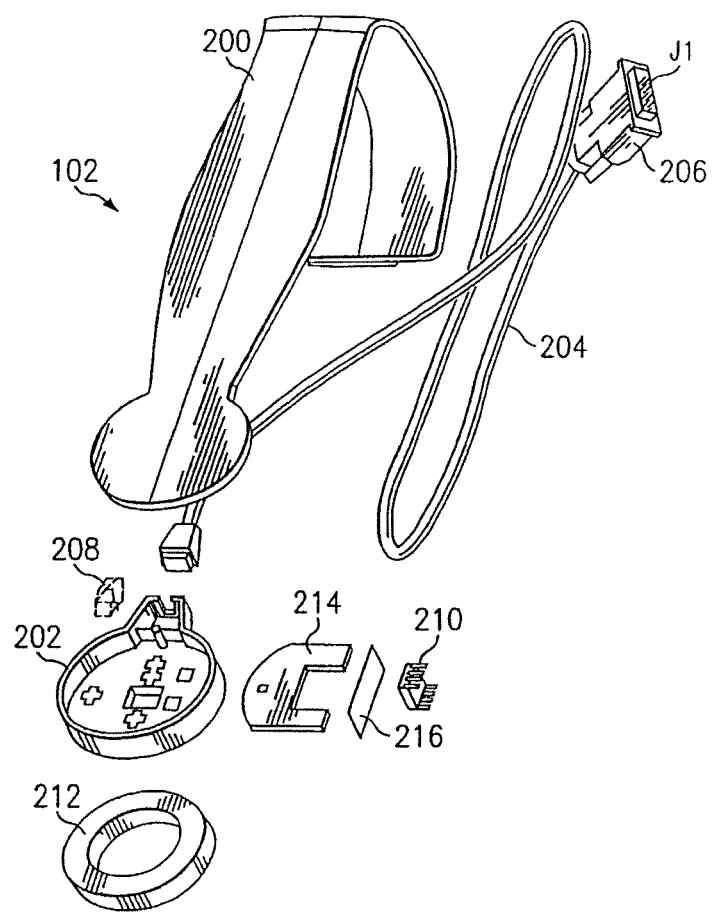
FIG. 2 illustrates an assembly view of a color calibration sensor according to one embodiment of the present invention.

FIG. 2 shows the components of sensor system 102. A hanger 200 is operable to position a photodetector 210 near a surface of backlit liquid crystal module 104. In a preferred embodiment, hanger 200 is composed of ABS plastic or any other material that is similarly lightweight and durable. Attached to hanger 200 is a housing 202. Housing 202 is compact, yet of sufficient size to contain photodetector 210. Sensor system 102 also includes an elastomeric or foam cushion 212, various electrical circuit components fixedly attached to a circuit board 214, a color filter 216, and a lens 208 operable to permit the passage of light.

Photodetector 210 is comprised of a linear silicon photodetector, an exemplary type of which is an OPT101P photodiode manufactured by Burr-Brown. The OPT101P operates from +2.7V to +36V, has a high responsivity of 0.45 A/W at 650 nm, and a quiescent current of 120 µA. Photodetector 210 is preferably spectrally non-selective and thus not a colorimeter. However, photodetector 210 can effectively function as a colorimeter because the flat panel make up of liquid crystal module 104 has Red, Green, and Blue filtration on its light output. Photodetector 210 works in conjunction with microcontroller 140 residing in flat panel monitor 108 in accordance with software instructions from an application residing in host computer 106 to calibrate liquid crystal module 104 by setting its luminance, color temperature, and gamma profile. Photodetector 210, with biasing circuits and an on-chip transimpedance amplifier whose output voltage increases linearly with light intensity, eliminates stray capacitance that can cause errors from leakage current, noise pick-up, and gain peaking. Photodetector 210 preferably operates in a photoconductive mode to take advantage of excellent linearity and low dark current. Photodetector 210 has a correlation to the actinic response of the human eye. Sensor system 102 is designed to perform its calibration function at a signal level centered about a count of 235 with a variance of +/−3 counts or about 1 sigma. This provides a 2 times guardband, or a +/−7 count allowable variance, which equates to an error of one ΔE*, the smallest change in three dimensional color space detectable by the human eye.

In a preferred embodiment, the characteristics of the linear silicon photodetector include low sensitivity in the 400 nm (Blue) portion of the electromagnetic spectrum but a relatively (about six times) higher response in the 700 nm to 900 nm (Red to Infrared) portion. To level out the sensitivity of the sensor element 210, color filter 216 is placed between sensor element 210 and lens 208. A narrow band green filter may be used to emulate the green channel of the green primary of liquid crystal module 104 in order to achieve speed and accuracy necessary to perform colorimetric calibrations for all R, G, and B channels. In a preferred embodiment of the invention, color filter 216 is comprised of a Light Steel Blue #720 cyan filter manufactured by GAM. Color filter 216 is operable to equalize the signal to level off the performance of photodetector 210 so that when photodetector 210 is calibrated to operate in the Green spectral region, correct sensitivity levels are maintained in the Red and Blue regions as well. The GAM Light Steel Blue #720 cyan filter 216 very nearly compensates for the OPT101's transmission characteristics, both with a midpoint relative response value of 0.35 at 580 nm. This results in a very uniform output response from 440 nm to 640 nm. Should signal strength need to be further attenuated, multiple layers of the color filter 216 may be utilized. For example, two blue-green filters may be used, one for chromatic sensitivity and the other for setting the proper luminance signal range.

The linear silicon photodetector 210 will respond accordingly to whatever wavelength of light reaches it after passing through color filter 216. To obtain the most accurate measurements for color calibration purposes, the angle at which light is measured from a flat panel liquid crystal module 104 must be kept small. Sensor system 102 operates to provide a narrow and uniform cone angle of incoming light which is presented to photodetector 210. This narrow and uniform cone angle enables sensor system 102 to accurately measure liquid crystal module 104 without the need to maintain a constant or critical distance from the surface of liquid crystal module 104. It also allows the sensor to be used in an off contact mode in order to measure the amount of veiling glare on the front surface of liquid crystal module 104 so that the software application can compensate for its effect on an image. In a preferred embodiment, lens 208 is a solid optical lens system, comprised of a front spherical surface through which the light passes in the manner of a Total Internal Reflection (TIR) 45-degree mirror. Light passing through lens 208 is turned to pass through the side of lens 208 and through the color filter 216 to photodetector 210. In a preferred embodiment, photodetector 210 is located at the infinity focus of lens 208. In one implementation, the lens 208 is injection molded from polymethylmethacrylate (PMMA) plastic material and has an index of refraction of 1.489.

By implementing lens 208 in this manner, a narrow and radiometrically constant measurement geometry of incoming light is presented to photodetector 210. Lens 208 provides a long focal length with a relatively small head configuration to keep the effective viewing angle at plus or minus two degrees (±2°) regardless of the distance of sensor system 102 or its attitude with respect to the front surface of liquid crystal module 104. Advantages made possible by this design include a sensor system 102 being able to make more accurate and enhanced measurements of a liquid crystal module 104 because the angular dependency is removed. The distance between photodetector 210 and liquid crystal module 104 is no longer critical because a uniform cone angle is always sampled. In a preferred embodiment, elastomeric or foam cushion 212 is included in sensor system 102 to block out ambient light which might affect the accuracy of the measurement. Cushion 212 also uniformly distributes the contact pressure of housing 202 out and away from the measuring spot at which sensor system 102 is aimed to reduce cell gap changes and sheer forces which might disturb the anchoring of liquid crystal modules. After a calibration operation, sensor system 102 can be used in the off contact mode to measure the amount of veiling glare caused by the ambient light. This is particularly useful in image proofing operations for digitally created content where the content creator and the publisher or printer reside in greatly differing ambient light environments. Sensor system 102 is also operable in off contact mode for use to calibrate individual sections of large video walls where contact measurements may be physically difficult to obtain.

During the addressing process for Thin Film Transistor (TFT) LCDs, a signal voltage is applied to the source electrode to be transmitted through the drain electrode to the liquid crystal layer and a capacitor. Even though the function of this capacitor is to dissipate its charge throughout the remainder of the frame cycle, there is still some 10% to 15% decay of the magnitude of the charge. This results in a slight non-uniformity of the transmission level (or grayscale level or "color") of the pixels during a cycle. It is this instability or "frame flicker" that can be interpreted as "noise" in other types of colorimetric devices. As a reference, this effect is much more pronounced in CRTs where there is a 100% decay in the light emission of a pixel for the greater part of a frame cycle.

Figure 3:
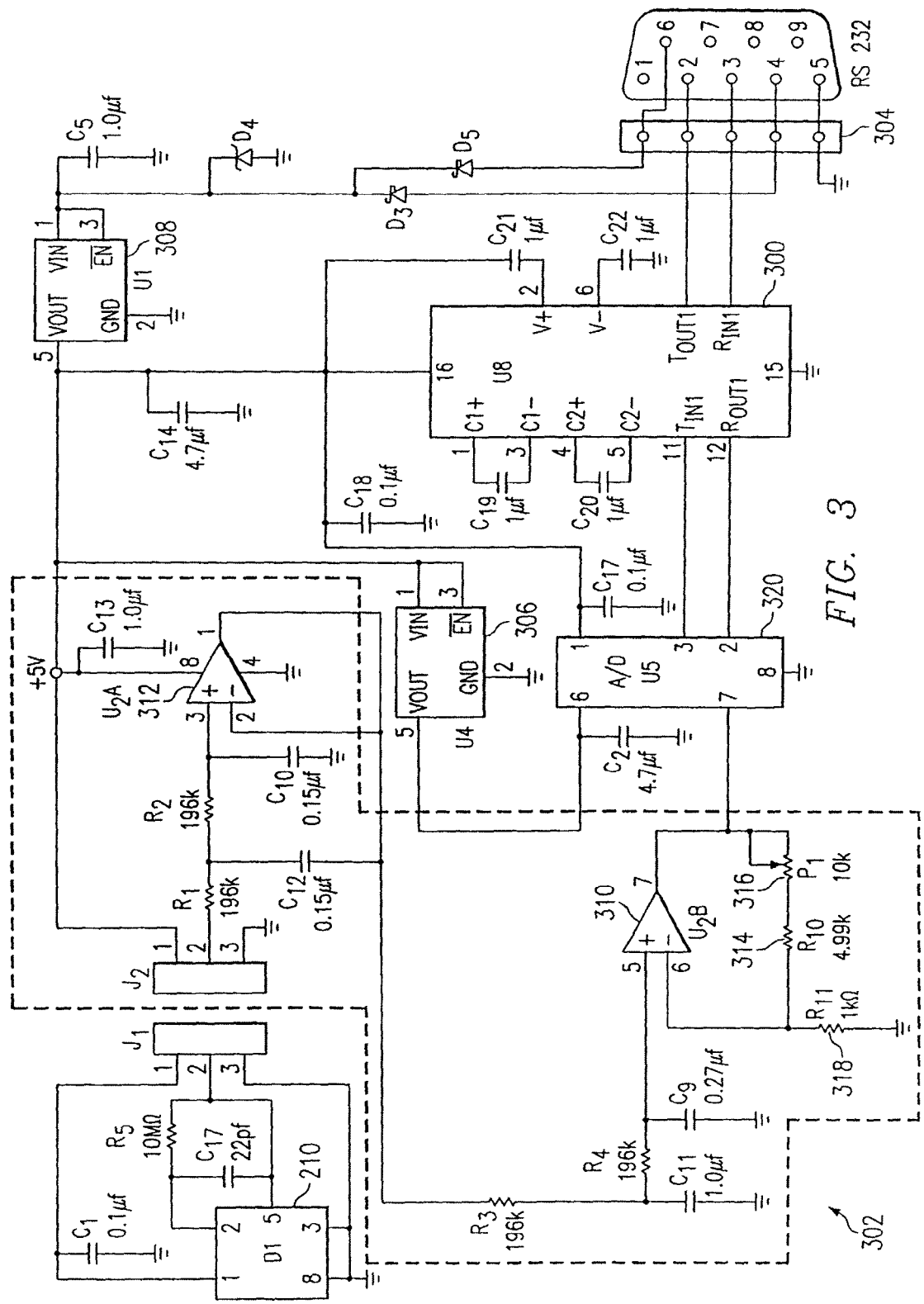
FIG. 3 illustrates a circuit schematic for an electronic filter in the color calibration sensor system.

FIG. 3 shows the schematic diagram of the electronics of circuit board 214. Such electronics include a microcomputer 300, a RS 232 or USB port 304, an Analog/Digital (A/D) converter 320, voltage regulators 306 and 308, filter circuit 302, and photodetector 210. Microcomputer 300 preferably has an 8 bit wide data path and 14 bit wide instructions that handle signals from and commands to photodetector 210. A/D converter 320 preferably has a 4 channel 8 bit implementation and sends the 0V to 5V analog signals from filter circuit 302 to microcontroller 140 to host computer 106 over the RS 232 or USB port. Microcomputer 300 can act as a pass through between host computer, panel computer, and itself.

Errors are inherent to all digital sampling systems from signals with frequencies above the sampling rate of the Analog/Digital (A/D) converter 320. This "aliasing" phenomena can make the signal appear as a low frequency distortion if left unfiltered and cannot be removed by post-acquisition processing. Filter circuit 302 is applied to the signal from the photodetector 210 prior to the digitizing process to perform an anti-aliasing function and secure the accuracy of the signal. In order to maximize the stability and accuracy of the sensor system 102, the electrical circuit design of circuit board 214 incorporates various elements into filter circuit 302. Two operational amplifiers ("op amps") 310 and 312 and several resistors and capacitors are used to form an active low pass network "Bessel" filter. The feedback loop includes two gain stages that are routed back into filter circuit 302 to produce a sharp cutoff with minimum phase distortion, a fast setting time, and a very high rejection ratio. This allows filter circuit 302 to stabilize the signals from photodetector 210 and effectively deal with whatever flicker is in liquid crystal module 104. The 4-pole Bessel filter provided by filter circuit 302 eliminates errors by removing signals with frequencies above the A/D sampling rate. Filter circuit 302 has a monotonically decreasing magnitude response and is characterized by an almost constant group delay across the entire bandwidth in order to preserve the wave shape of the signals being filtered. Insensitive to environmental changes and aging, filter circuit 302 preferably has an 80 db cutoff at 60 Hz.

In a preferred embodiment, large dynamic range micropower dual op amps 310 and 312 are used that feature a high bandwidth-to-power consumption ratio with true rail-to-rail inputs and outputs. Op amps 310 and 312 can achieve a 200 kHz gain-bandwidth product and are unity-gain stable while driving any capacitive load and do not suffer from midswing common-mode-rejection degradation or crossover nonlinearity. A series resistor 314 and a single-turn potentiometer 316 for fine tuning the signal range are placed between the negative input and output of op amp 310 while another resistor 318 is placed between the negative input of op amp 310 and ground. These elements collectively control the range of signals from the photodetector 210 to A/D converter 320 in the following manner: Resistor 314 divided by Resistor 318 plus 1 sets the Minimum Gain, while (Potentiometer 316 plus Resistor 314) multiplied by Resistor 318 plus 1 sets the Maximum Gain. By this method, photodetector 210 may be calibrated over a broad range of frequencies with an attenuation of 17-bits which is equivalent to a signal-to-noise ratio of 10,000 decibels (dB) down.

The flat panel liquid crystal module 104 is typically illuminated by two sets of colored lamps, identified as Source 1 (Red) and Source 2 (Blue), each with a different spectral output. The light from each of these sources is filtered by Red, Green, and Blue absorption filters within liquid crystal module 104. Illumination from Source 1 produces a white point (R=G=B=255) that has a correlated color temperature of approximately 3,650 K. Illumination from source 2 produces a white point color temperature of approximately 12,300 K. Sensor system 102 allows both the screen luminance and the color temperature to be independently set by adjusting the intensity of each illumination source. The white point of liquid crystal module 104 can theoretically be set to a range of color temperatures from 3,600 K to 12,000 K. Over this restricted range of Daylight white illuminants, a vector representation of the inverse of the correlated color temperature has been determined that varies linearly with the chromaticity coordinates. The calibration and setup of a dual primary monitor can be simplified for sources with very stable chromaticities. The output of each source need not be absolute if its chromaticity is stable. Such stability enables the use of the present sensor design that is calibrated for the Green channel where the bandgap energy is most stable.

Figure 4:
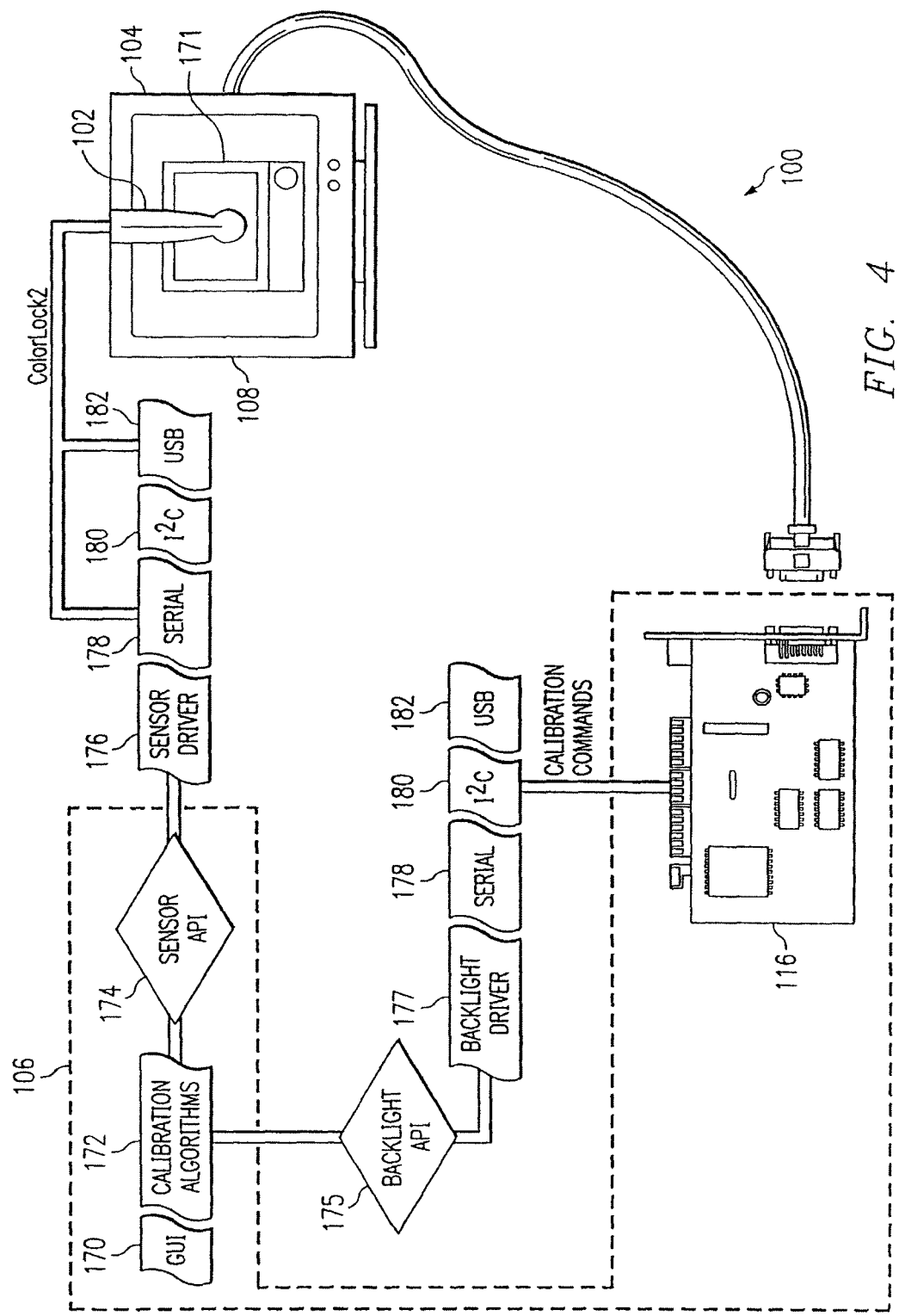
FIG. 4 illustrates a simplified diagram of software modules that interact with the color calibration sensor.

FIG. 4 shows the relationship of various hardware and software components to sensor system 102 in a cross platform solution embodiment. Calibration software module 172 resides in host computer 106 connected through graphics card 134 in flat panel monitor 108 via video interface cable 183 and is platform independent. Calibration software module 172 provides a graphical user interface 170 to liquid crystal module 104 residing within flat panel monitor 108 to prompt the user to initiate the generation a series of gray scale splash screens 171 used in the calibration operation. Calibration software module 172 passes control information through sensor application programming interface 174 to sensor driver module 176 to instruct sensor system 102 to measure the luminance level of each splash screen generated on liquid crystal module 104. Sensor system 102, with the aid of onboard firmware, transmits the luminance levels of the gray scale splash screens from liquid crystal module 104 through either a serial interface 178, an I²C interface 180, or a USB interface 182 to calibration software module 172. Upon completion of the diagnostic portion of the calibration session, calibration software module 172 provides control information from graphics device 134 through backlight application programming interface 175 to backlight driver 177 residing within flat panel monitor 108 over the I²C interface portion 180 of video cable 183 to set the appropriate white balance and luminance levels on the backlight of liquid crystal module 104. The RGB chromaticity information from this calibration operation can then be used to calculate the proper gamma values to load into lookup tables for flat panel monitor 108. All the luminance, white balance, and gamma information can also be saved as an International Color Consortium (ICC) monitor profile with Adobe Photoshop and communicated electronically to other monitors and used to calibrate them as well in a Master/Slave relationship. This embodiment is to make available the differentiated features of specific flat panels types on a wide variety of video cards without being dependent on each card vendor to enable the specific features or confronting the user with a difficult OSD challenge. This software would also provide a consistent user experience, facilitating the addition of more features over time.

In order to function as an absolute luminance sensor, sensor system 102 is calibrated using a known transfer standard. An example of a known transfer standard is a Minolta CS-100 Colorimeter. A flat panel display with adjustable luminance and a Colortron Spotlight Precision Light Table are also used in the process as the light sources. The luminance response of the CS-100 Colorimeter has been set by the manufacturer to a standard lamp and its chromaticity coordinates have been adjusted using a spectral radiation standard lamp at 3111° K calibrated by the Electro Technical Laboratory of the Japanese Ministry of International Trade and Industry. In a preferred embodiment, a display uses a red and blue lamp pair for illumination. The intensity of each lamp pair may be changed to set the color temperature and luminance of the display. The calibrated target luminance for the display is 200 Candelas/m² and the target color temperature is a Daylight white modified Blackbody temperature of D55. It is preferable to achieve the luminance target than the color temperature target.

After achieving the appropriate targets, red and blue signals are set to zero so that only the green signals are applied to photodetector 210. The potentiometer P1 in filter circuit 302 is adjusted to achieve a value of 235 counts from A/D converter 320. The voltage at the output of amplifier 310 is checked to make sure it is in saturation. A 0.3 neutral density is placed in front of photodetector 210 to determine whether the reading drops to 117 or 118 counts for verification of saturation. If the signal does not drop, photodetector 210 has too much light falling on it and the neutral density filtration must be increased. If increased filtration is needed, all previously selected trial samples are recalibrated. The count for the Red and Blue screens are then checked, and if they exceed 240, the spectral filtration is decreased in the Red and Blue spectral regions. If the count falls below 128, the spectral filtration is increased in the appropriate region. Once sensitivities are set to the proper operating ranges, sensor system 102 is ready for general production.

Along with calibration software module 172 in host computer 106, calibration software module 172 is operable to calibrate liquid crystal module 104 by setting its luminance, color temperature, and gamma profile. The task of calibration software module 172 is to determine the color temperature of the flat panel liquid crystal module 104 in response to luminance measured by microcontroller 140, whose lamps do not linearly track with the drive signal, by using only a spectrally non-selective photodetector 210. Calibration software module 172 measures the gamma or luminance response of liquid crystal module 104 and can store information in an International Color Consortium (ICC) profile used by the International Color Microcode standard for color encoding. Since the lamp drivers are nonlinear, the initial state of the system is unknown. Calibration software module 172 uses the color mixing law and provides a conversion for the relative color vectors to chromaticity coordinates in order to permit a determination of the relative contributions of the Red, Green, and Blue channels of luminance Source pair 1 and luminance Source pair 2. The tristimulus values produced by the Red, Green, and Blue color filters are stable. Therefore, the colorimetric output of each individual filter of liquid crystal module 104 can be determined.

The initial state and the signal linearity (from the alternating current (AC) lamp inverter power source) can be determined in the following manner. First, the illumination levels for both Source 1 and Source 2 are set to the minimum and the signal level is recorded. Second, the illumination output from Source 1 is increased in four steps from the minimum to the maximum and the signal levels are recorded. Next, the illumination output from Source 2 is increased in four steps from the minimum to the maximum and the signal levels are recorded. Finally, the difference in the signals may be used to map the outputs of the two sources as a function of the input signal. From the starting tristimulus values, the initial and differential state of the illumination sources can be determined. Appendix A shows an example of the calibration determination. Once calibration software module 172 in host computer 106 along with microcontroller 140 has made this determination, calibration software 172 can set the luminance and color temperature of the liquid crystal module 104. Given a required correlated color temperature, the chromaticity coordinates for that point as well as the necessary lamp drive voltages for a required luminance can be determined based on the fact that each illumination source contributes a known proportion of the colorimetry to the mixture. Additionally, adjustments to the display colorimetric settings may be made by bypassing the graphics card 116 in host computer 106 and accessing microcontroller 140 directly by means of manually interacting with OSD board 128. In a preferred embodiment, a user is able to provide input to calibration software module 172 and receive output from microcontroller 140 by means of GUI 170. Calibration software module 172 should also provide information by means of GUI 170 to enable a user to generate an International Color Consortium (ICC) profile for liquid crystal module 104, preset colorimetric values, and create and store custom user settings. Calibration software module 172 can also calculate correlated color temperature and report brightness to plus or minus two percent. Calibration software module 172 integrates over several cycles for improved stability.

Sensor system 102 has an optical path with spectral filter elements that provide the proper colorimetric properties that linearly correlate a standard signal with the luminance of liquid crystal module 104 in the Green spectral region. From this correlation, a relationship can be established with the other primary channels. Using a spectrally nonselective photodetector, the chromaticity of the primary color filters in liquid crystal module 104 can be determined from measuring their luminance. Moreover, by calibrating the white point, all the gray scale points and RGB color primaries are matched as well. Since the backlight is common to all colors in liquid crystal module 104 and varies in a known stable way within the whole range, setting one primary color can effectively set all the others. Thus, setting the gamma response curve for white can also set the gamma for the RGB color channels. Similarly, setting the gamma response curve for the RGB color channels can also set the gamma for all the gray scale levels of white. For a cathode ray tube device, the different primaries may require different gamma corrections as the setting of one primary color may be affected by an interaction from the other primary colors.

Figure 5A:
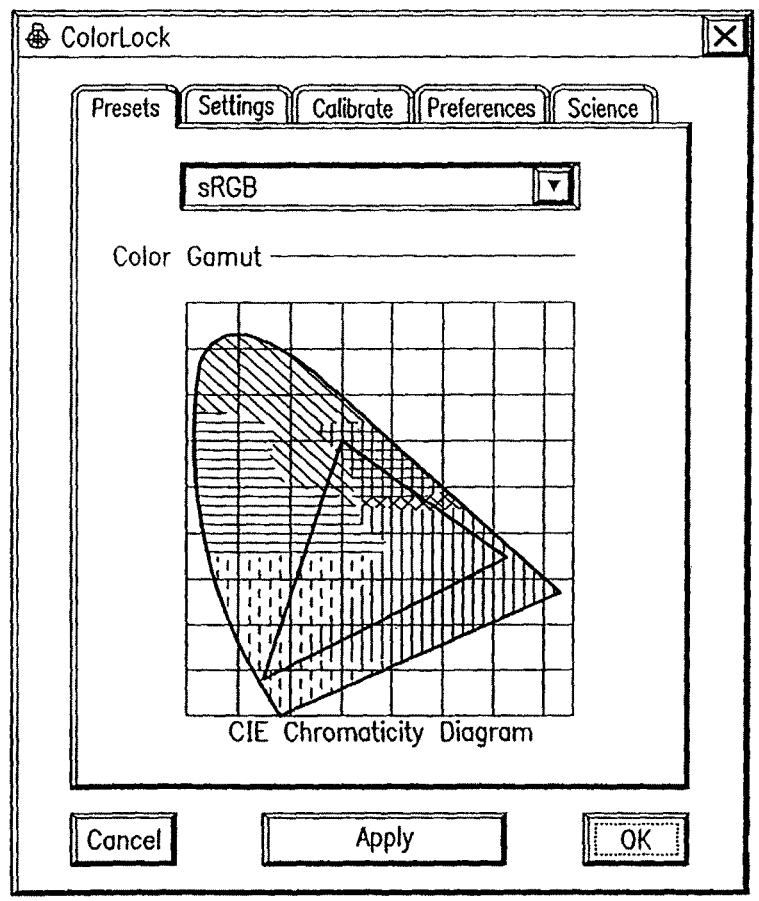
Figure 5B:
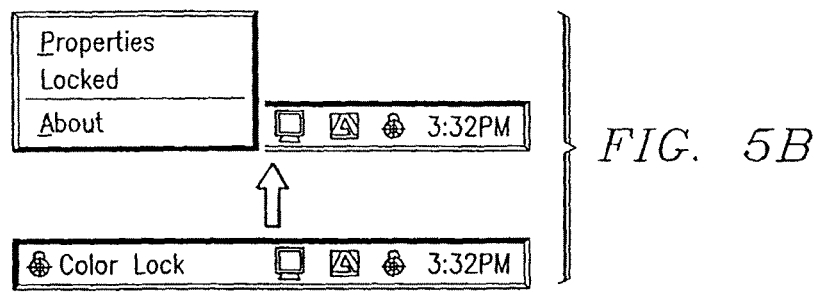
Figure 5C:
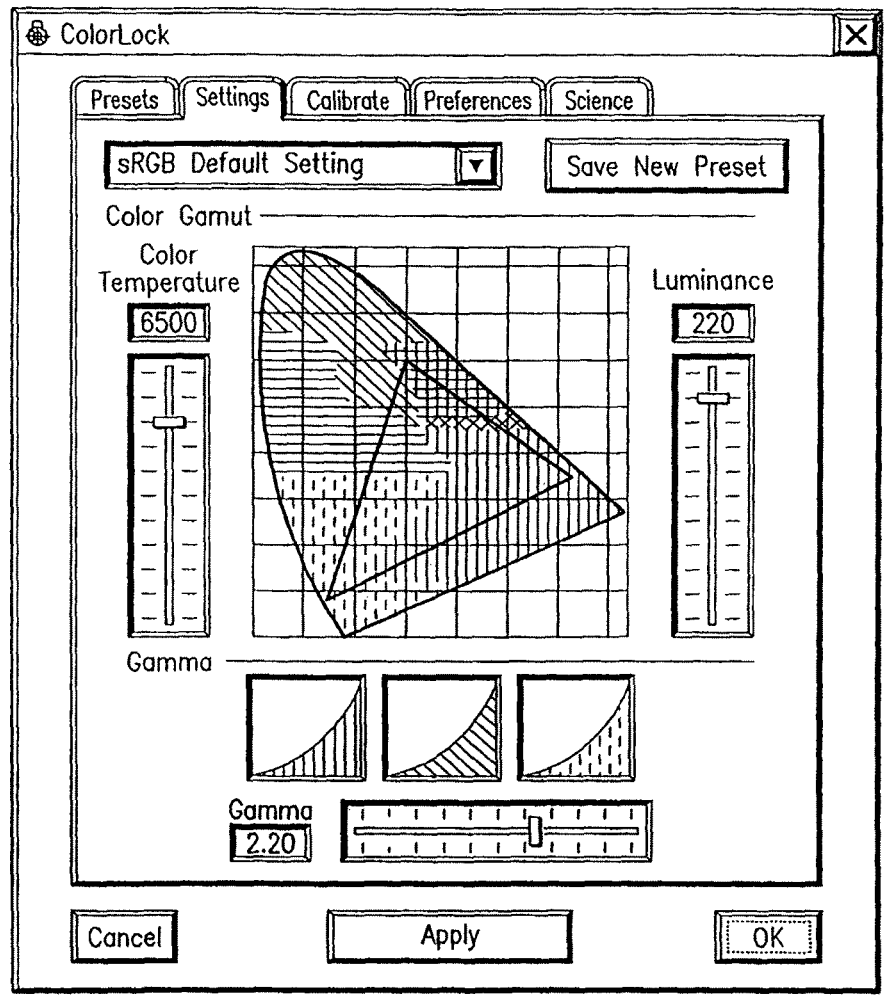
Figure 5D:
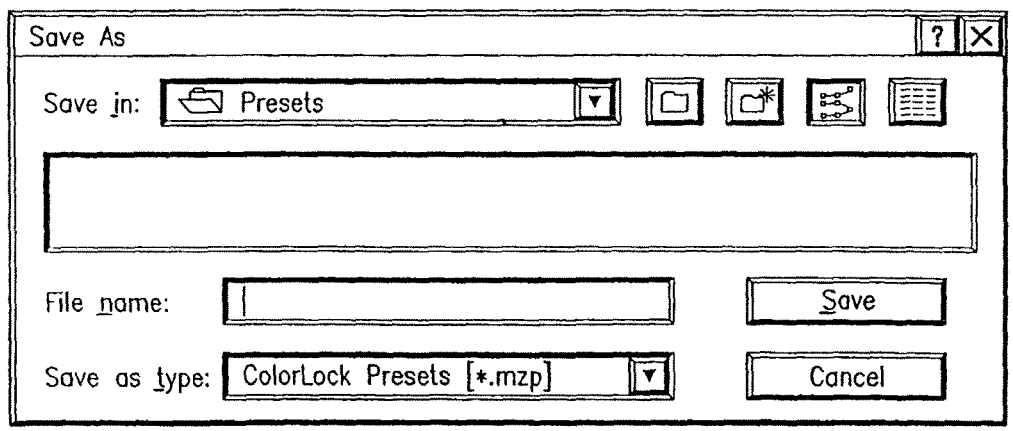
Figure 5E:
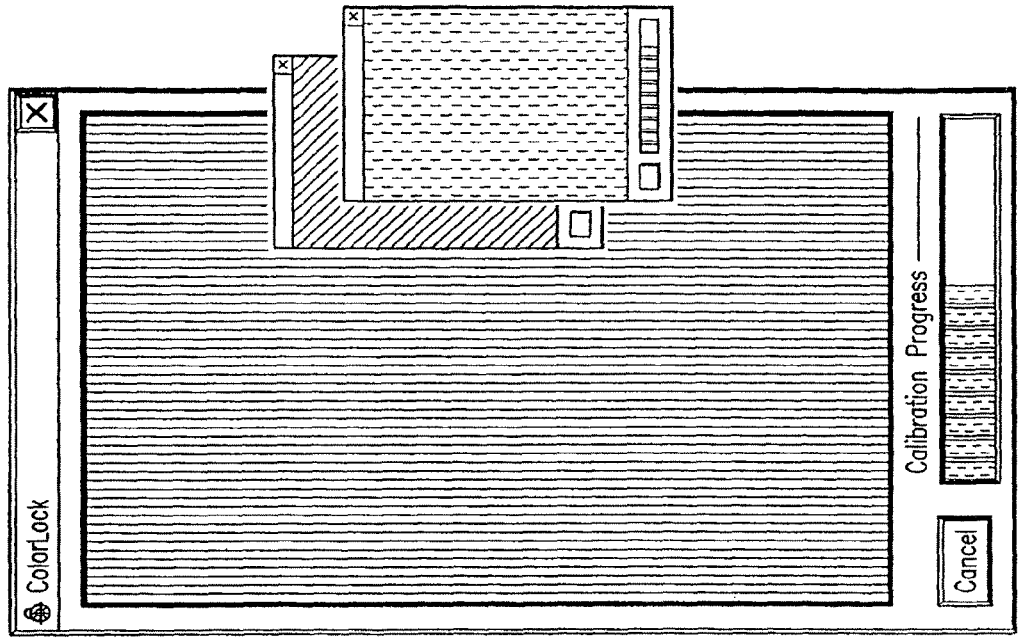
Figure 5F:
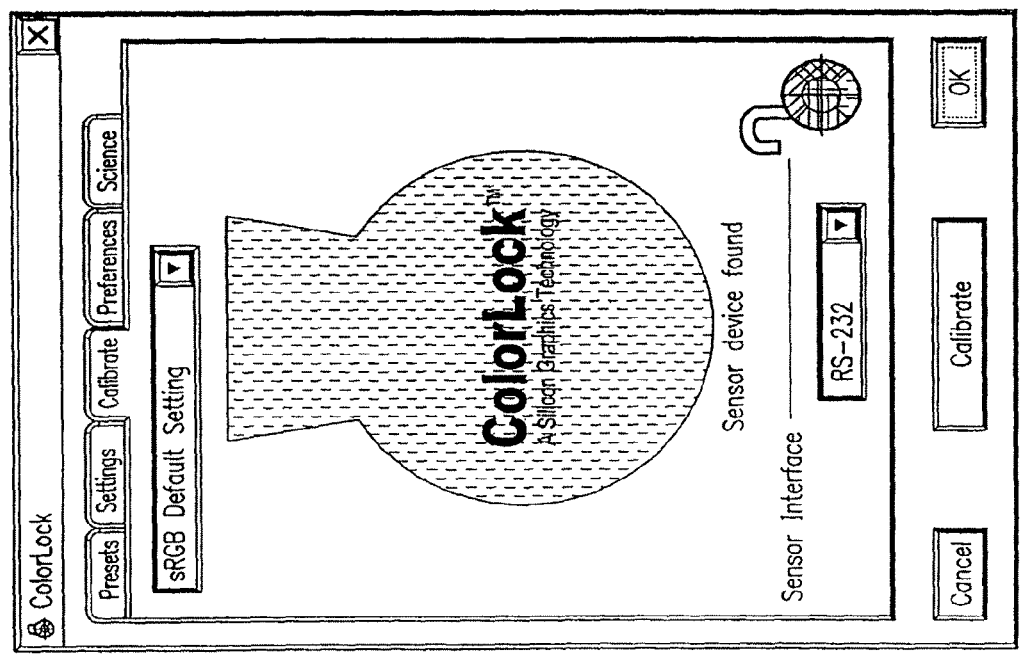

FIGS. 5A-H show the screen displays provided by graphical user interface 170. FIG. 5A shows a preset calibrations window. FIG. 5B shows a detect properties menu. FIG. 5C shows a customized settings window where specific color temperature, luminance, and gamma values may be set by the user. FIG. 5D shows a window to save custom settings. FIG. 5E shows a calibrate display window where calibration of liquid crystal module 104 is initiated. FIG. 5F shows the splash screen windows of red, green, and blue used during calibration. FIG. 5G shows a calibration complete window. FIG. 5H shows a preferences window.

Sensor system 102 may also be used to correct an on-screen image for unwanted light reflected from the surface of liquid crystal module 104. By using the spectrally nonselective photodetector 210 and color filter 216 within sensor system 102 in an off contact mode, a quantitative correction factor to the gamma setting of liquid crystal module 104 may be obtained to maintain the appearance of an image on two or more spatially separated monitors despite the relative ambient viewing conditions.

Liquid crystal module 104 operating in ambient conditions suffers from the external lighting in the environment to some degree. This external luminance can cause stray reflections when it strikes the surface of liquid crystal module 104 which in turn causes desaturation of the colorimetry of an image (or even text) as well as adversely affecting its contrast. These stray reflections can lower the gamma profile of liquid crystal module 104. Sensor system 102, when held approximately twenty inches above the surface of liquid crystal module 104, can measure the ambient light from liquid crystal module 104 and correct for it by appropriately modifying the gamma response curve of liquid crystal module 104 so that the saturation and hue of the original image is maintained. Calibration software module 172 will accomplish this correction by applying a secondary gamma curve as a transfer function correction. For example, the gamma curve will be increased in the case of bright ambient conditions. In another preferred embodiment, the gamma correction can be accomplished by directly adjusting the bias voltages driving liquid crystal module 104. Because desaturation from veiling glare is caused by the magnitude of the reflected luminance from liquid crystal module 104, the white point setting of the dual spectrum lamps will not be affected. Since sensor system 102 integrates all the reflected room light reaching the viewer of liquid crystal module 104, a first order correction at the veiling glare problem is obtained. Additionally, in the process of designing a filter to equalize the response of the photodetector, a major portion of the infrared energy is eliminated, which would affect the accuracy of the veiling glare adjustment. All of this is accomplished with a single non-spectrally selective photodetector 210.

Video or static images or scenes are created, edited, stored, and then presented on media according to the values for hue, saturation, and color temperature with which the director of photography, author, or editor imparts to them. Once they are so imprinted and/or duplicated, no further changes to the above identified properties for individual portions of the content are possible without changing those properties for all the content. The viewing experience of any video or still imagery may be enhanced through the use of dynamic control of the color temperature of electronic or film media through the use of a dual- or multi-spectrum lighting source. The content author or editor may store a discrete track of color temperature values in synchronization with visual digital media such as Digital Video (DV), High-Definition Television (HDTV), eCinema, Digital Video Disk (DVD), as well as video stored in QuickTime, AVI, RealVideo, or other formats. It is also foreseeable that this method of enhancement would work favorably in other formats including vector animation such as Flash, presentation software such as Microsoft PowerPoint, slide-show software, tagged static image file formats such as JPEG or GIF images in web pages, PhotoCD, TIFF, PhotoShop, and other formats.

Different color temperature values may be encoded in a track or other suitable memory location within a given storage medium that are synchronized to appropriate scenes or images within the visual content being presented. Calibration software module 172 is operable to control liquid crystal module 104 and transmit the encoded color temperature values over a video signal cable (DDC), serial interface, Universal Serial Bus (USB) interface, or other suitable interface protocol. This information can then be detected by image drivers residing in liquid crystal module 104 that are capable of having color temperature controlled independently of tri-stimulus image data via the video signal cable (DDC), serial, USB, or other control mechanism. Some standards have been developed that encode critical color calibration parameters about the creation or printing of a given image within the body of data that describes that image. Flat panel color calibration system 100, however, includes a backlit liquid crystal module 104 with adjustable color temperature data wherein color temperature of the liquid crystal module 104 can be adjusted in a dynamic manner. Calibration software module 172 can provide dynamic adjustment of color temperature of different frames of the displayed image for both playback and authoring environments. In addition standard file formats such as TIFF, QuickTime, and others can be extended to include color temperature data information.

It should be noted that in addition to the dynamic adjustment of color temperature, the brightness of liquid crystal module 104 can also be synchronized to the static or video image content being displayed. Calibration software module 172 can be instructed to examine the gray scale content of a frame or series of frames to compute, in one embodiment, an arithmetic mean of the dynamic brightness level. Acting upon instructions from a given set of parameters, calibration software module 172 can transmit control information from graphics card 134 through backlight application programming interface 175 to backlight driver 177 to dynamically set the appropriate brightness level for liquid crystal module 104 by controlling the voltage levels to lamp source 1 and lamp source 2 in tandem. In another embodiment, this information may be pre-recorded on a separate information track for access during playback of the video content.

It should also be noted that, in concert with the dynamic adjustment of white balance and brightness, calibration software module 172 may also be instructed to dynamically adjust the gamma profile of the original video image according to a given set of parameters such as those contained in a look-up table memory location within host computer 106 or graphics card 134. By coincidentally lowering the backlight brightness level of liquid crystal module 104 and decreasing the gamma function so that the same luminance level is maintained, greater color visual impact may be realized from a static or video image. In another embodiment, the change in gamma can be accomplished without loss of gray scale resolution by dynamically applying and adjusting a set of gamma controlling voltages to the DC reference circuit of liquid crystal module 104 to change its gamma response profile. Because the input video signals are not affected, the same color resolution and dynamic range are maintained.

Flat panel calibration system 100 provides a low cost high performance capability to calibrate display devices and extend the serviceable life of display devices. By being able to adjust a display device to a known standard, a content creator, director of photography, and printer/publisher can effectively consummate a proofing process in minutes over great distances. Color temperature and gamma savvy versions of DVD players and other software applications may also be developed and accommodated. While the present sensor system takes advantage of adjustable white balance and adaptive gamma technology, it can be utilized for both standard LCD and CRT devices as well.

Thus, it is apparent that there has been provided, in accordance with the present invention, a compact flat panel color calibration system that satisfies the above-described advantages. Although the present invention has been described in detail, it should be understood that various changes, substitutions, and alterations may be readily ascertainable by those skilled in the art and may be made herein without departing from the spirit and scope of the present invention as defined by the following claims.

APPENDIX A

Sensor Calibration Algorithm
[1] Turn Red Lamp ON with the Blue Lamp OFF and record $R_1$, $B_1$, $G_1$
[2] Turn Blue Lamp ON with the Red Lamp OFF and record $R_2$, $B_2$, $G_2$
[3] Define the Color Coordinates for each Lamp $$D_1 = 128[R_1 - B_1)/(R_1 + G_1 + B_1)]$$

$$D_2 = 128[R_2 - B_2)/(R_2 + G_2 + B_2)]$$

[4] The Color Temperature of the Red Lamp is $T_1$
The Color Temperature of the Red Lamp is $T_2$
[5] The target value for D (an arbitrary color coordinate) for an arbitrary Color Temperature T is gas as:

$$D = \Gamma/T + a$$

where F is the slope and a is a constant
[6]

$$\Gamma = T_1 T_2 [(D_1 - D_2)/T_2 - T_1]$$

[7]

$$a = (D_2 T_2 - D_1 T_1)/(T_2 - T_1)$$

Setting the Color Temperature and Screen Luminance
ASSUMPTION: The Luminance value for Green is a linear function of screen luminance.
[1] From a desired value for T, the target value of D and $D_T$ can be calculated from $$D = \Gamma/T$$

[2] Choose a target value for Screen Luminance, $G_T$
[3] Set both lamps in the center of their respective ranges or at the last Luminance state if a calibration has just been performed.
Measure the initial state, $R_I$, $G_I$, $B_I$ Red drive $S_{RI}$+Blue drive $S_{BI}$
[4] Decrement the Red Lamps and measure $R_J$, $G_J$, $B_J$ for $S_{RI}$−10
[5] Return Red setting to original value and decrement the Blue Lamp measuring $R_K$, $G_K$, $B_K$ for $S_{BI}$−10
[6] Calculate $G_I$, $G_J$, $G_K$, $D_I$, $D_J$, $D_K$ and form the following derivatives:

$$\Delta D_R = (D_I - D_J)/10 \text{ derivate } Dw/r \text{ Red}$$

$$\Delta D_B = (D_I - D_K)/10 \text{ derivate } Dw/r \text{ Blue}$$

$$\Delta G_R = (G_I - G_J)/10 \text{ derivate } Gw/r \text{ Red}$$

$$\Delta G_B = (G_I - G_K)/10 \text{ derivate } Gw/r \text{ Blue}$$

[7] Assuming the system is linear:

$$D_T = D_I + \Delta D_R \cdot \Delta_R + \Delta D_B \cdot \Delta B$$

$$G_T = G_I + \Delta G_R \cdot \Delta_R + \Delta G_B \cdot \Delta B$$

and $$\begin{vmatrix} D_T - D_I \\ G_T - G_I \end{vmatrix} = \begin{vmatrix} \Delta D_R & \Delta D_B \\ \Delta G_R & \Delta G_B \end{vmatrix} \cdot \begin{matrix} \Delta_R \\ \Delta_B \end{matrix}$$

Solve for $\Delta_R$ and $\Delta_B$ which is the amount of the Red and Blue lamps must be changed, and the new starting value for the initial state becomes $$S_{RI\,New} = S_{RI\,OLD} + \Delta_R$$

$$S_{BI\,New} = S_{BI\,OLD} + \Delta_R$$

Iterate until the state is reached where $$D_T - D_I = 0 \text{ and } G_T - G_I = 0$$

What is claimed is:
1. A system for calibrating a display, comprising:
a sensor system for measuring color correction information of a plurality of screens of a visual digital media;
a calibration logic module for receiving the color correction information associated with each screen of the visual digital media; and wherein the calibration logic module further applies control information to a backlit driver for dynamic control and adjustment of a display providing the plurality of screens of the visual digital media in response to the color correction information of the plurality of screens of the visual digital media.

2. The system of claim 1, wherein the color correction information is stored in a storage medium apart from the visual digital media.

3. The system of claim 1, wherein the color correction information is encoded in the visual digital media.

4. The system of claim 1, wherein each image frame of the visual digital media has color correction information associated therewith.

5. The system of claim 4, wherein the calibration logic module
synchronizes application of the color correction information to corresponding image frames of the visual digital media.

6. The system of claim 1, wherein the color correction information includes any of color temperature, brightness, gamma, white balance, and luminance.

7. The system of claim 1, wherein the calibration logic module maintains a luminance level of the display by lowering backlight brightness and decreasing gamma.

8. The system of claim 1, wherein the calibration logic module examines a gray scale content of one or more image frames of the visual digital media and computes an arithmetic mean of a dynamic brightness level of the display.

9. The system of claim 8, wherein the calibration logic module sets a brightness level for the display from the arithmetic mean by controlling two lamp sources in tandem driving the display.

10. A method for calibrating a display, comprising:
instructing a sensor system to measure color correction information of a plurality of screens of a visual digital media;
receiving the color correction information associated with each screen of the visual digital media; and
applying control information to a backlit driver for dynamic control and adjustment of a display providing the plurality of screens of the visual digital media in response to the color correction information of the plurality of screens of the visual digital media.

11. The method of claim 10, wherein the color correction information is stored in a storage medium apart from the visual digital media.

12. The method of claim 10, wherein the color correction information is encoded in the visual digital media.

13. The method of claim 10, wherein each image frame of the visual digital media has color correction information associated therewith.

14. The method of claim 13, further comprising:
synchronizing application of the color correction information to corresponding image frames of the visual digital media.

15. The method of claim 10, wherein the color correction information includes any of color temperature, brightness, gamma, white balance, and luminance.

16. The method of claim 10, wherein applying the color correction information includes maintaining a luminance level of the display by lowering backlight brightness and decreasing gamma.

17. The method of claim 10, further comprising:
examining a gray scale content of one or more image frames of the visual digital media;
computing an arithmetic mean of a dynamic brightness level of the display.

18. The method of claim 17, further comprising:
setting a brightness level for the display from the arithmetic mean by controlling two lamp sources in tandem driving the display.

* * * * *